Dec. 23, 1930. F. H. OWENS 1,786,027
APPARATUS FOR REPRODUCING PHOTOGRAPHIC SOUND RECORDS
Filed July 13, 1927

INVENTOR.
FREEMAN H. OWENS.
BY John B Brady
ATTORNEY

Patented Dec. 23, 1930

1,786,027

UNITED STATES PATENT OFFICE

FREEMAN H. OWENS, OF NEW YORK, N. Y.

APPARATUS FOR REPRODUCING PHOTOGRAPHIC SOUND RECORDS

Application filed July 13, 1927. Serial No. 205,442.

In the recording of sound photographically, it is sometimes advisable to record on a single film a plurality of sound records. These records may be all recorded simultaneously from a single source of sound at different frequencies in order to compensate for the variations in recording lamps used for this purpose, or they may be records of different sounds which may be reproduced together, such as for instance a song with piano accompaniment, either recorded simultaneously, or at different times and the two or more records printed synchronously upon the same strip of film.

My invention pertains to apparatus for reproducing such sound records from a single film and has for its primary object a provision of means for selectively reproducing the sound records individually or collectively, or in any combination, as desired.

My invention includes among its objects the provision of a separate photo electric cell for each of the sound records on the strip of film.

Another object is to provide for separately adjusting the amount of light passing through each record to its photo electric cell.

Other objects and advantages in details of construction and arrangement of parts will be apparent as the description proceeds, reference now being had to the figures of the accompanying drawings wherein like reference numerals indicate like parts.

In the drawing:—

Figure 1:
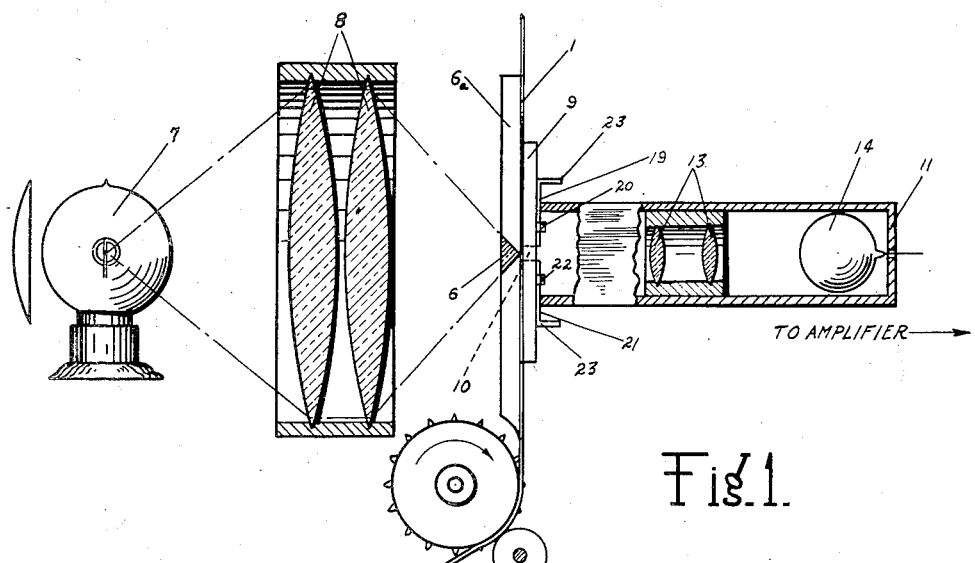
Figure 1 is a diagrammatic side view of one form of apparatus designed to carry out my invention.
Figure 2:
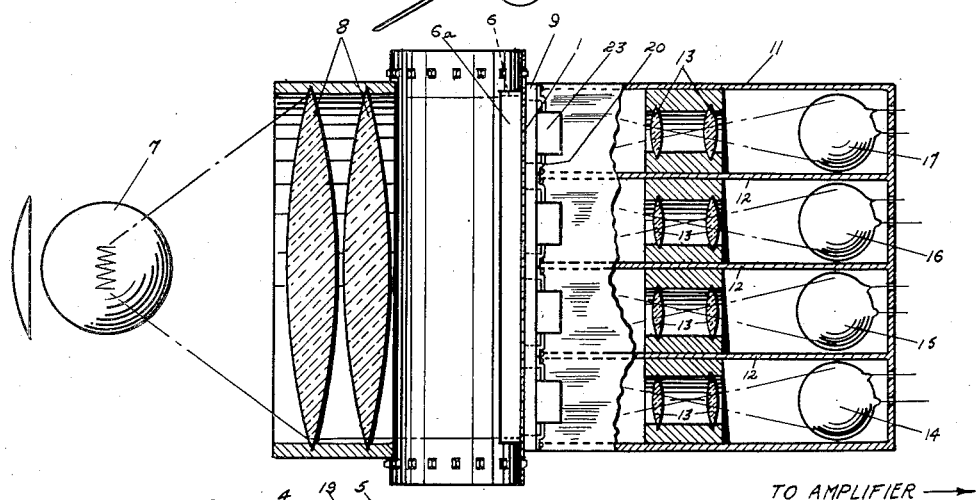
Figure 2 is a top plan view thereof.
Figure 3:
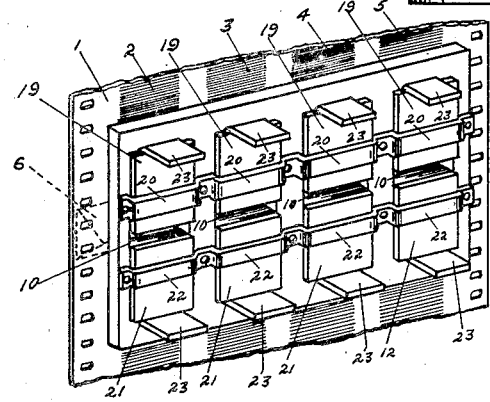
Figure 3 is a detail perspective illustrating my arrangement of masks for each of the sound records on a strip of film.

For convenience, I have illustrated a strip of photographic film 1, upon which has been recorded or printed four sound records 2, 3, 4 and 5. These sound records, as before stated, may be of all of the same subject, for instance, an orchestration number, recorded at different frequencies, or they may each be of different sources of sound which can all be "played" or reproduced together to create a harmonious reproduction.

In reproducing these sound records from the film 1, this film may be taken from any suitable source of supply (not shown) and moved past a slit member 6, in this instance a prism, in back of which there is located a source of light 7, the rays of which pass through condenser lenses 8, to the slit member 6. The slit 6 may be supported in the plate 6a, which also acts as a gate for the film. The light passing through the slit 6, also passes through the film 1, and is varied in its density in accordance with the photographic sound records through which it passes. A single lamp as shown may be sufficient for all of the sound records on a film, or if desired, a separate lamp may be provided for one or more of such records.

On the opposite side of the film 1 from the slit 6, and in engagement with the film 1, is a plate 9. This plate is provided with a series of slits or openings 10, one for each sound record of the film 1. The slits 10 are located directly opposite the slit member 6 and in alignment with the lamp 7, whereby the varied light passing from the lamp 7 through the various sound records on the film 1 may be passed on through the slits 10.

The plate 9 carries a casing 11 projecting rearwardly therefrom and this casing is divided into compartments by the partitions 12, one compartment for each of the sound records on the film. Located within the compartments are lenses 13 through which the light rays from the sound records pass to a series of photo electric cells 14, 15, 16 and 17, one for each sound record. As is well known, these photo electric cells change the varying light rays coming from the sound record into electric impulses which are transmitted to suitable amplifiers and one or more loud speakers.

In order to control the amount of light passing through the slit 10 to the photo electric cell, and consequently the volume of sound reproduced by such cell, or in order to cut off the passage of such light entirely from one or more of the slits, I provide the plate 9 with a plurality of sliding masks comprising the upper sections 19 guided through suitable straps or guideways 20, and lower sections 21 guided through similar straps or guideways 22. Each of the sections 19 and 21 are provided with outwardly turned finger pieces 23 by means of which they may be adjusted toward and away from each other to enlarge or reduce the slits 10 through which the light passes from the slit member 6 and the film records.

The operation of my invention is as follows: Assuming that the four records on the film 1 have been recorded in one of the ways above described, and it is now desired to reproduce the same, the film 1 is moved past the slit 6 with the light from the lamp passing therethrough, and the electric impulses set up by the photo electric cells transmitted to the amplifier. The operator may now, if he desires, manipulate the mask members 19 and 21 in such manner as to cut out altogether one or more of the sound records, or reduce or increase the volume of any one or more of them by increasing or reducing the size of the respective slits 10. For instance, assuming that on record number 4, the lower pitched notes on the recorded sound greatly predominate because of the frequency at which they were recorded in this record, and the volume of such notes or tones as reproduced in the loud speaker is too great for the balance of the tones on the other record, the operator can by adjusting the masks 19 and 21 for record number 4 reduce the amount of light passing through the slits 10 to the photo electric cell 16; or, assuming that one or more of the sound records is a song and the other an instrumental accompaniment, and that the accompaniment records are greater in volume than the song, the operator merely modifies the accompaniment record by means of the masks until the reproduced music is properly toned.

It will be understood, of course, that if desired, a single photo electric cell so positioned as to catch the light rays from all of the sound records, may be substituted for the individual photo electric cell for each record. The preferred embodiment, however, is that shown in the drawings with a separate photo electric cell for each sound record.

I claim:—

1. In a device for the reproduction of sound records the combination comprising a strip of film bearing a plurality of sound records, a light source for said records, independent photo electric cells for each of said sound records, a slit member through which the light rays from said source pass from said sound records to said photoelectric cells and means for independently controlling the amount of light passing through each record to its photo electric cell, said means comprising a plate past which said film moves and provided with an opening for each record in alignment with said slit member, and shutter members for adjusting the size of each opening.

2. In a device for the reproduction of sound records the combination comprising a strip of film bearing a plurality of sound records, a light source for said records, independent photo-electric cells for receiving the light rays passing through said records from said light source, a slit member through which the light from said source passes to said photoelectric cells, a plate member having adjustable openings in alignment with said slit member, said film being movable between said plate and said slit member and in contact therewith, said photoelectric cells being separated by light tight compartments.

3. In a device for the reproduction of sound records the combination comprising, a plurality of photographic sound records, a light source for illuminating said records, means for confining light from said source to portions of said records, individual light sensitive devices for receiving modulated light from each of said records, and individual means for controlling the relative amount of modulated light received by each of said light sensitive devices with respect to the other said light sensitive devices.

FREEMAN H. OWENS.